United States Patent [19]

Henry

[11] Patent Number: 5,397,474

[45] Date of Patent: Mar. 14, 1995

[54] TREATMENT OF WASTES

[75] Inventor: Peter D. Henry, Brookfield, Australia

[73] Assignee: The University of Queensland, St. Lucia, Australia

[21] Appl. No.: 78,306

[22] PCT Filed: Dec. 19, 1991

[86] PCT No.: PCT/AU91/00587

§ 371 Date: Jun. 18, 1993

§ 102(e) Date: Jun. 18, 1993

[87] PCT Pub. No.: WO92/11210

PCT Pub. Date: Jul. 9, 1992

[30] Foreign Application Priority Data

Dec. 19, 1990 [AU] Australia .............................. PK3985

[51] Int. Cl.$^6$ .............................................. C02F 3/04
[52] U.S. Cl. ...................................... 210/615; 210/150
[58] Field of Search ........................ 210/615, 150, 151

[56] References Cited

U.S. PATENT DOCUMENTS 3,231,490 1/1966 Fry ...................................... 210/615
4,666,593 5/1987 Bosne .................................. 210/150

FOREIGN PATENT DOCUMENTS 62721 6/1977 Australia .
3816285 11/1989 Germany .
1-119395 5/1989 Japan .
2-52094 2/1990 Japan .
2-194895 8/1990 Japan .
1576009 10/1980 United Kingdom .
WO91/01279 2/1991 WIPO .

OTHER PUBLICATIONS

M. C. M. Van Loosdrecht et al, "Biofilm bioreactors for wastewater treatment", Trends in Biotechnology, 1: 117–121 (1993).

Primary Examiner—Ivars Cintins
Attorney, Agent, or Firm—Griffin, Butler, Whisenhunt & Kurtossy

[57] ABSTRACT

A process for treatment of biological waste includes passing biological waste liquid downwardly through at least one substantially vertically oriented curtain having a reinforcing layer of support material. Attached thereto is at least one layer of flexible reticulated open cellular material having a plurality of communicating cells which form a support for filamentous micro-organisms and/or symbionts included in the filamentous micro-organisms. The filamentous micro-organisms and/or symbionts form a dense mat of cellular material adhering to the support. The biological waste is collected after passage through the curtain for ultimate disposal.

25 Claims, 5 Drawing Sheets

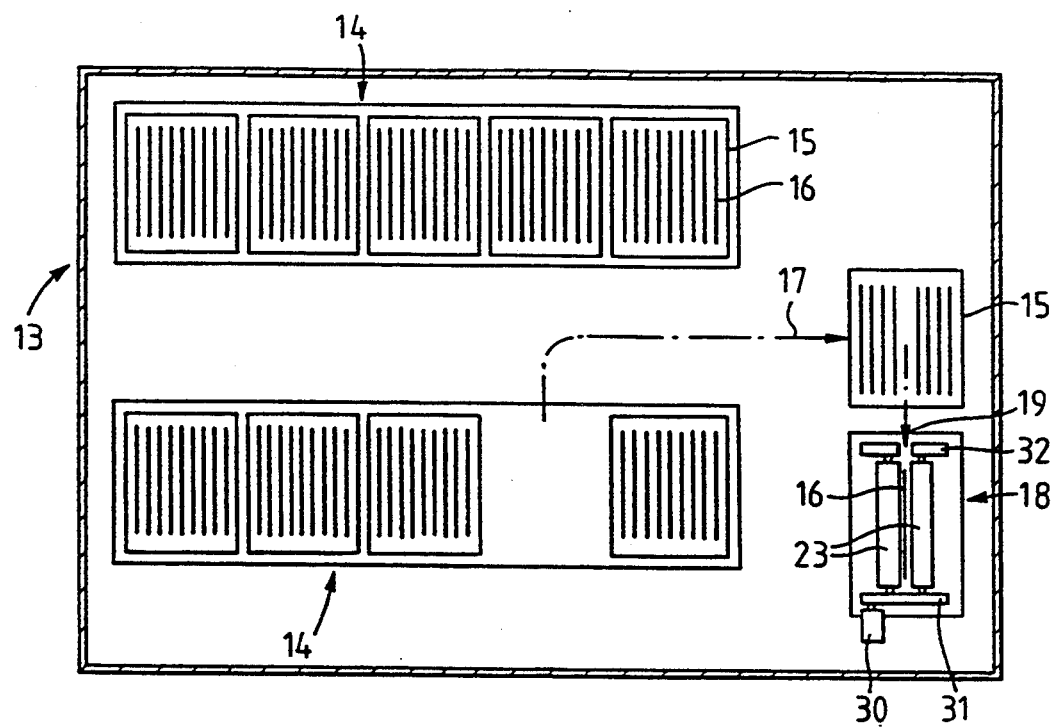
Fig.1.
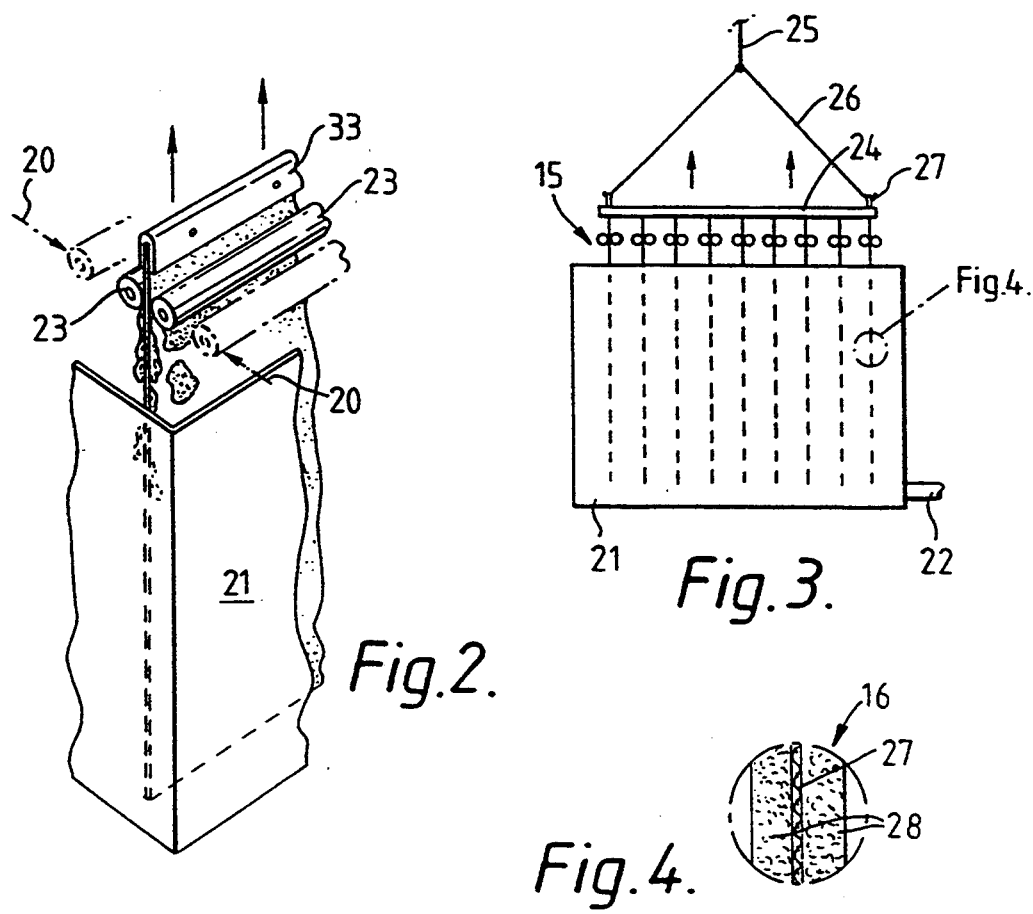
Fig.2.
Fig.3.
Fig.4.

TREATMENT OF WASTES

This invention relates to treatment of wastes and in particular treatment of biological wastes such as effluent in the form of waste liquors from piggeries, breweries, fermentation tanks, distilleries and the like. It will however be appreciated that the invention can be applied to any wastes capable of being metabolised by filamentous micro-organisms such as fungi and bacteria.

BACKGROUND OF THE INVENTION

Safe, convenient and economic disposal of waste products, particularly biological wastes, remains a problem for society. As municipal authorities become increasingly aware of their responsibilities in this area, legislation usually requires commercial enterprises to ensure that safe disposal occurs of wastes resultant from their activities. As an incentive for a commercial enterprise to undertake the necessary treatment prior to disposal of its waste products, financial penalties are levied by municipal authorities unless the treated waste meets certain requirements before discharge into the public sewer system.

Some waste materials of interest include piggery (and other animal) wastes, brewery wastes, cattle feedlots (beef and dairy), domestic activities inclusive of sewage, fruit Juicing, canning, abattoirs, dairy and cheese factories, alcohol distilleries, soft drink factories and food processing.

The basic thesis underlying the treatment of biological wastes is that the biochemistry and microbiology of each waste, and then that of the proposed treatment process, must be understood in order for the treatment to work in the desired manner. It is precisely because an understanding of these fundamentals has been lacking, that a comprehensive treatment of wastes inclusive of biological waste has yet to be proposed.

Pig wastes for example consist of a solid portion made up of faecal matter and spilt feed, and a liquid portion consisting of urine, water lost from the drinking fountains, wash-water used in cleaning the piggery and a small quantity of material infused from the solid portion. The solid material contains two fractions one of which is easily digested and represents 36–40% of the total solids (ie Hobson and Robertson (1977) in Applied Science Publishers Ltd London entitled "Waste Treatment in Agriculture") while the other fraction is of low digestibility. The digestible fraction contains proteins, fats and carbohydrates, organic acids and breakdown products of nitrogenous compounds while the relatively indigestible fraction is largely lignocellulose. The two fractions in the solid portion are closely interlinked with each other. The liquid portion is rich in salts derived from the urine and contains nitrogen, both as urea and as ammonia, and elements in high concentration such as calcium and phosphorus as well as potassium, sodium, iron, copper, zinc, sulphur and chloride. Both the solid and the liquid portions harbour a rich flora of micro-organisms in which it would be unusual not to find some pathogens. The solid faecal portion is rich in iron, copper and zinc which are provided as additional supplements to the pigs for nutritional reasons. The entire waste has a unique and, to most people, unpleasant odour.

If it assumed that the mean body-weight of a pig in a piggery producing bacon is 47 kg, then such a pig voids daily 0.263 kg of faeces and urine as drymatter and around 2.5 liters of water in urine. If it is further assumed that a herd of 1000 sows would contain a mean population of 9050 pigs at any one time, then the daily output of faeces and urine (drymatter) would be 2.38 tonnes and the output of urine as water would be 22,626 liters. These data are used merely to outline in general the size of the daily waste output of a piggery. When combined with wash-water the output of waste is formidable, and a piggery of the size just postulated could produce 200,000 liters of liquid waste per day.

It therefore will be appreciated that the opportunities which would arise from a treatment process which would deal adequately with piggery and other biological wastes are considerable and could be marketed on a global scale.

The implications of development of such a treatment process, if successful, are that pig farming would no longer be regarded as a nuisance industry, a danger to public health and a despoiler of the environment.

In relation to successful treatment of piggery waste, for example useful criteria that may be taken into account for a successful disposal of such waste may include the following:

1. That the unpleasant odour associated with piggery waste—both solid and liquid—be removed.
2. That pathogens such as *Salmonella, Escherichia coli, Campylobacter* and *Treponema* be destroyed.
3. That water derived from the treated waste be capable of reuse, at least as wash-water, and be suitable and safe for disposal to land if so required. This implies that the pH of the treated water be around neutrality (eg. in the range 6.5–7.5).
4. That the indigestible lignocellulosic sludge be stabilised and made safe for disposal to land.
5. That part of the waste be converted to a product which has some economic value.
6. That the total oxygen demand (TOD) in the waste be reduced significantly.
7. That preferably the nitrogen in the waste water be reduced significantly.
8. That preferably the phosphorus in the waste be reduced significantly eg. by at least 30% of its original concentration.
9. That the production of greenhouse gases—methane and carbon dioxide—be minimised by absorbing a significant amount of carbon in the waste into microbial cells.
10. That preferably the residence time of the water undergoing treatment in the process be of relatively short duration eg not to exceed 8 days.
11. That some or all of the preceding criteria be realised by the treatment, and the capital and operating costs be less than that of any other comparable process.

It will be appreciated that the above criteria may also be modified. substantially when dealing, with successful disposal of other biological waste (eg brewery waste or distillery waste).

It has also been shown in Henry Aust. Vet. J 51, 317–319 (1975), Henry et al Appl. and Environ Microbiol 31, 813–818 (1976), Henry et al Search, 161–163 (1976), Henry et al Appl and Environ Microbiol 1132–1136 (1979) and Henry et al J. Appl. Bacteriol 55, 89–95 (1983) that working with piggery wastes showed that when the liquid and solid wastes (10% solids) are combined in a closed vessel and maintained at a temperature of 37° C. and fed once daily on a semi-continuous regime with a 5-day residence time, a fermentation takes place and the digestible parts of the solids are converted mostly to organic acids and carbon dioxide, although some of the resultant compounds have a nitrogenous component. The fermentation is effected by the anaerobic bacteria present in the waste which has been voided by the pigs.

There is virtually no methane or hydrogen in the headspace of the bioreactor. The proteins, fats and carbohydrates in the waste are thus converted by the fermentative and acid-forming organisms to relatively simple chemical compounds (eg. acetic acid). The result is a separation of the digestible and indigestible parts of the solid portion of the piggery waste. The digestible part of the solids thus becomes part of the liquid portion of the waste which has become, as a result, rich in organic acids. This separation must take place if the criteria for successful treatment, which have been listed, are to be realised.

The semi-continuous fermentation proceeds at a pH of 5.8-6.0. The combination of acid pH and short residence time enables much of the carbon liberated by the fermentation to be incorporated into organic acid. concentrations of 200 mM (range 170-210) of volatile fatty acids are obtained. At the pH of the fermentation the VFA present in the waste are in the form of acid salts eg. ammonium acetate, propionate, butyrate, valerate and caproate. If the pH is lowered to −4.6 or less with mineral acid (eg. sulphuric acid), about 85% or the acid salts are converted to free acid (eg. acetic acid, propionic acid etc.). Free VFA will kill pathogenic bacteria such as *Salmonella* and *Escherichia coli*, and Henry et al Journal Appl. Bact. 55: 89-95 (1983) demonstrated that total destruction of these organisms could be effected in piggery waste. The concentrations of VFA repaired to kill *salmonella* and *E. coli* are 30 mM and 90 mM respectively at pH 4.0 and 30° C. The fermented liquor is held for two days at pH 4.0 and 30° C. to kill the pathogens and this also enables clarification of the fermented liquor to occur. The settled sludge consists of lignocellulose from the faeces and this is well stabilised (ie. it is not easily fermentable any further and it is odourless when wet or dry). In subsequent work Henry and Cossins (1982 unpublished) found that this treatment removed *Vibrio cholerae* from an aqueous medium and Henry in 1988 (unpublished) found that three species of *Campylobacter* would not survive this treatment. It is expected that treponemes would also be eliminated as they are much more fragile organisms than the enterobacteriaciae (eg. *Salmonella*), but this has not yet been proved by experiment.

Henry as established by the abovementioned Appl. and Environ. Microbiol. 1976 and 1979 references then showed that a yeast, *Candida ingens,* growing as a pellicle on fermented piggery waste could remove almost all (95%) of the organic acids—volatile and non-volatile—and another nitrogenous compound, methylindole (skatole) (Henry unpublished) a breakdown product with an unpleasant odour, of the amino acid tryptophan. It was found that *C.* ingens also removed much of the ammonia nitrogen, and phosphorus. Mineral analysis of *C. inqens* demonstrated that the organism growing as a pellicle on fermented piggery waste contained phosphorus as 7% of the dry matter (Henry et al Appl. Environ above 1976). It was shown much later by Henry (1984 unpublished) when working with alcohol distillery wastes that *C. ingens* could metabolise many of the amino acids. A notable fact arising from growing *C. inqens,* as a pellicle, on fermented piggery waste is that the yeast removes the unpleasant odour from the waste.

The only odour in the spent liquor remaining after treatment with *C. ingens* is a faint mustiness.

Features of the pellicle process are:
1. The waste is fermented semi-continuously (feeding the fermenter once daily) for a 5-day residence time. (A 6-day residence did not increase the concentration of .organic acid). This inhibits the formation of methane and miniwises the formation of carbon dioxide so that most of the carbon is directed into organic acid compounds.
2. The fermented liquor is held for two days at pH 4.6 or less in another vessel to settle the undigested solids (lignocellulose) and destroy the pathogens.
3. The fermented liquor, freed of bacterial pathogens, is then treated aerobically by Candida inqens to remove the unpleasant odour, most of the carbon present as organic acids and some of the nitrogen and phosphorus.

The yeast derived from the treatment is suitable as a feed for monogastric animals such as pigs, poultry and domestic pets. The spent liquor is suitable for use as wash water or for irrigation.

While work on the pellicle process was approaching completion, and commercialisation was being contemplated, the pig industry underwent a rapid change in structure and a number of very large units were established. As sunlight damaged *C. ingens,* the shallow ponds in which *C. ingens* grew on fermented pig waste had to be covered. In these large units the volume of liquid to be accommodated in covered ponds was so great that the process became of doubtful economic value.

At that time the only other technologies using aerobic processes to effect rapid treatment of liquid wastes were submerged culture in a bioreactor or aeration using a motor-driven paddle aerator. Neither of these technologies met the criteria for successful treatment of piggery waste described above and therefore were found to be deficient.

For example, the production of single cell protein (SCP) by the aerobic surface of culture of yeasts or biological wastes has been disclosed, inter alia, in Australian Patent No. 475824 and U.S. Pat. No. 4,115,593.

Similarly, although production of SCP from liquid wastes using yeasts in submerged culture has been tested, it has not, as yet, reached commercialisation, principally because, while submerged culture has advantages over the surface method, the equipment purchase, operational and maintenance costs weigh against its adoption.

Similar problems as described above in relation to disposal of piggery wastes were encountered in regard to disposal of other wastes in for example the brewing industry and also in distilleries such as rum distilleries where effective disposal of dunder (ie cane juice or waste) is relatively difficult. Thus for example in relation to brewery wastes such wastes are deficient in some nutrients that are essential for microbial growth and thus such nutrients which include nitrogen sulphur and phosphorus have to be added as crude agricultural chemicals before biological waste treatment can be carried out. This in turn created problems in pH reactions. In relation to disposal of dunder this is a high strength waste and it has been ascertained that the efficiency of removal of nutrients from a waste by microorganisms is inversely related to the concentration of nutrients in the waste. An extreme illustration of this principle is the complete inhibition of the growth of micro-organisms by high concentrations of sugar or salt in solution. Dunder with a TOD of about 100,000 mg per liter contains extremely high concentrations of a wide variety of organic compounds and some minerals such as potassium and this is a major factor which so far has prevented effective biological treatment of such waste. This factor also applies to successful treatment of brewery waste which has a TOD of 60,000 mg per liter.

Other techniques that have been utilised so far in treatment and disposal of biological wastes and which have proved deficient for similar reasons as discussed above include the following:

(i) a combination of anaerobic and aerobic treatments which are included in conventional "activated sludge" plant.

(ii) anaerobic ponds and septic tanks which are a modified form of anaerobic ponds; and (iii) pits included in piggery floors wherein piggery effluent is passed to these pits and mixed by a paddle wheel or alternatively a system where slits located in a piggery floor open out into a tear drop shaped pit which is connected to a drain for disposal of effluent.

Reference may also be made to trickling filters which usually comprise a plurality of rocks or other suitable particular matter wherein waste of a relatively low TOD value (ie between 10–100 mg per liter) may be trickled through the rocks whereby after a period of time a bacterial film will form on the rocks under the influence of air which also may be blown through the rocks. This will result in oxidation of compounds in the waste. However one basic disadvantage of this process was that often great difficulty was achieved in sloughing the bacterial film of the rocks after a period of time. This meant that often the bacterial film was anaerobic in nature which meant that the compounds in the waste could not be oxidised. Also this process like all other conventional processes could not be used with biological wastes of high TOD value such as distillery waste, brewery waste or piggery waste described above.

It therefore is the object of the present invention to provide a process and apparatus for effective treatment of biological wastes which may alleviate the problems discussed above in relation to conventional methods of biological waste treatment.

SUMMARY OF THE INVENTION

The process of the present invention includes the following steps:

(i) passing biological waste liquid downwardly through a substantially vertically orientated curtain formed of a flexible reticulated cellular material which may form a support for filamentous microorganisms and/or symbionts included in said filamentous microorganisms whereby said filamentous micro-organisms and/or symbionts form a dense mat of cellular material adhering to said support.

(ii) collecting said biological waste effluent after passage through the curtain for ultimate disposal.

Step (i) above is suitably carried out by trickling the biological waste liquid through the curtain at a flow rate of between 0.40 to 1.00 liters per sq m of curtain per hour. If these limits are exceeded the flow rate of waste liquid through the curtain may be too slow or too fast. More preferably a suitable flow rate is between 0.50–0.75 liters per sq m of per hour curtain and most preferably a preferred flow rate is 0.625 liters per sq m per hour of curtain.

The biological waste liquid may be drip fed to the handing curtain if applied to the top of the curtain or is more preferably applied to one side or both sides of the hanging curtain at a relatively gentle.

In any event it is desirable that a gap is provided between the source of waste fluid (eg sparget nozzle or jet orifice) and an adjacent curtain surface so that micro-organisms cannot grow or occupy the gap. This would occur for example if the source of waste fluid was too close to the curtain surface.

The residence time of the biological waste liquid from the top of the curtain to the bottom of the curtain is suitably of the order of 1.5–3 hours per meter fall and more suitably is 2–2.5 hours per meter fall.

The curtain may have a length of from 3–5 meters but is more suitably 4 meters.

A suitable source of oxygen as to enable the organic acids to be metabolised by the micro-organisms may be provided by pressurised air from an air blower, fan or air compressor. Preferably the air is humidified to provide a water content of at least 60% and more preferably of at least 90% so as to reduce evaporation on the hanging curtain. However humidified air may not be necessary when applied to brewery waste or distillery waste. The pressurised air also enables carbon dioxide which is evolved to be flushed from the area immediately adjacent to one or both sides of the curtain.

While some biological wastes such as brewery waste, distillery waste or starch factory waste may be applied directly to the hanging curtain it has now been found that other non-fermented biological wastes (eg piggery waste, sewage waste, cattle feedlot waste or abattoir waste) should undergo an initial fermentation process before being applied to the hanging curtain. This of course will depend if the waste contains complex macromolecules such as carbohydrates, proteins or lipids which may have to be broken down to generate organic acids of 8 carbon atoms or less. Preferably such fermentation takes place in the presence of hydrolyric acid formers or fermentative anaerobes or in some cases even facultative anaerobes. Such bacteria may therefore cause an acidogenic fermentation step and may comprise bacteria found in the rumen or the large bowel of cattle or pigs. Such bacteria may comprise *Bifidobacterium, Lactobacillus, Clostridia, Anaerobic cocci, Bacteroides sp* or *Fusobacteria*. As a result of this fermentation step organic acids such as volatile fatty acids may be produced which are readily metabolised to carbon dioxide by the hanging curtain.

The fermentation period may take 5 days or more or until such time when methane is formed when the fermentation may be stopped immediately. Suitably after a fermentation step has been carried out in a large vat or fermentation tank soluble digestible matter may be collected as supernatant and separated from insoluble material or undigestible material that may contain lignocellulose.

The invention may also comprise waste treatment apparatus for use in the abovementioned process. Suitably the apparatus comprises a hanging curtain which may support the growth of adherent filamentous micro-organisms. The curtain may be impregnated or coated with the filamentous micro-organisms which can metabolise the biological waste as described above. There also may be provided means for supplying liquid biological waste to the hanging curtain and support means for hanging the curtain. There also may be provided means for passing pressurised air over one but more preferably opposed broad surfaces of the sheet material.

The sheet material is formed of a flexible open cellular material (ie. wherein each cell may communicate with each other) such as reticulated cellular foam. Most preferably the sheet material comprises a reinforcing layer of dacron or nylon or other suitable polymeric or synthetic material sandwiched between two layers of a soft reticulated polyurethane foam.

Preferably there is provided collection means for collecting processed waste after passage through the hanging curtain and this may comprise a large tank or pit whereby treated waste may be pumped to a suitable receptacle.

Most preferably there are provided an array of curtains that may be hung or attached from a common support so that a plurality of modules each comprising the common support and the array of curtains are provided in a common processing area or plant. The common support may include a suitable support frame which is suitably movable eg. on ground supporting wheels or as a carriage on tracks. Alternatively the common support may be movable by suitable means (eg overhead crane or gantry) to a harvesting location whereby each curtain may be harvested of micro-organisms by suitable harvesting rollers. Alternatively other harvesting means may be employed such as high pressure sprays, ultrasonics or enzymatic means. However the use of one or more harvesting rollers which may engage an adjacent curtain surface is preferred. The harvesting step may also be in two stages—ie. an initial gentle press to remove liquor for recycling purposes followed by a more rigorous or hard press to harvest high cell densities.

It is also preferred that injection of air occur at or adjacent the top of the hanging curtain and that such air be humidified as described above. The supply of pressurised air may be useful to flush carbon dioxide away from an adjacent curtain surface.

It will be appreciated that each waste liquor will have its own preferred micro-organism(s) to be used in the treatment process. Conveniently, if a suitable micro-organism is not already known, then an analysis of the liquor to be treated may identify a suitable microorganism.

For example, an analysis of brewery waste isolated and identified *Geotrichum fragans*—a filamentous fungus; *Kloeckera lindneri*—a yeast; *Candida SP*—a yeast which has yet to be granted a specific epithet; and two bacteria which included—*Bacillus sp* (a motile bacterium) and *A corynebacterium sp* (a coccobacillus).

Similarly, acidophilic but as yet unidentified fungi suitable for the treatment of piggery waste have been located growing in the effluent stream of a pickle factory.

Preferably, the micro-organism is ohydrophobic and will grow as a pellicle on the waste liquor of interest.

More preferably, the micro-organism is a yeast bacterium or fungus. Suitable micro-organisms include the known yeasts *Kloeckera lindneri, Piehid membranaefaciens* and *Candida sp* (eg. *Candida ingens* (a strain of which is deposited under the Budapest Treaty as ATCC Deposit No. 36119), the known fungus *Geotrichum fragans* which comprises a suitable filamentous microorganism that will strongly adhere to the curtain and two bacteria *A Bacillus sp* (a motile bacterium) and *A Cornyebacterium sp* (a coccobacillus). Optionally, additional micro-organisms without the preferred capacity for adherence to the curtain can be used as symbionts. These include the known yeasts or bacteria referred to above as well as *C inqens*. These non-adherent symbionts are retained in the microbial population, when the biomass is being harvested, by being entrapped within the filaments of the adherent micro-organism.

The micro-organisms to be used in the treatment process are prepared either on liquid or solid media or freeze dried organisms and inoculated onto the curtain which has been saturated in the waste liquor to be treated. The waste is then trickled continuously through the support and after an appropriate period a thick microbial lawn covers the curtain.

The organisms eventually produce such a thick lawn that nutrition is denied to some cells and the efficiency of the curtain is impaired. To overcome this problem, some cells are. removed so that a young vigorously growing cell population can be maintained. This can be effected by harvesting excess growth as described above.

It will be appreciated that after harvesting a viable representative residue of the micro-organism population still remains because of the adherence of the filamentous micro-organisms, and any entrapped symbiont yeasts and bacteria, to the curtain.

It will also be appreciated that a naturally occurring and self-reproducing cell immobilisation on a solid support is provided. This immobilised population begins vigorous regrowth when more waste is fed to the top of the curtain.

BRIEF DESCRIPTION OF THE DRAWINGS

Reference may now be made to a preferred embodiment of the invention as shown in the attached drawings wherein:

FIG. 1 represents a plan view of a schematic representation of an array of hanging curtains constructed in accordance with the waste treatment apparatus of the invention;

FIG. 2 represents a perspective view of a harvesting assembly for use with the waste treatment apparatus of the invention;

FIG. 3 represents an end view of the harvesting assembly shown in FIG. 2;

FIG. 4 represents a detailed view of the construction of a hanging curtain for use with the invention;

DESCRIPTION OF PREFERRED EMBODIMENTS

Figure 5:
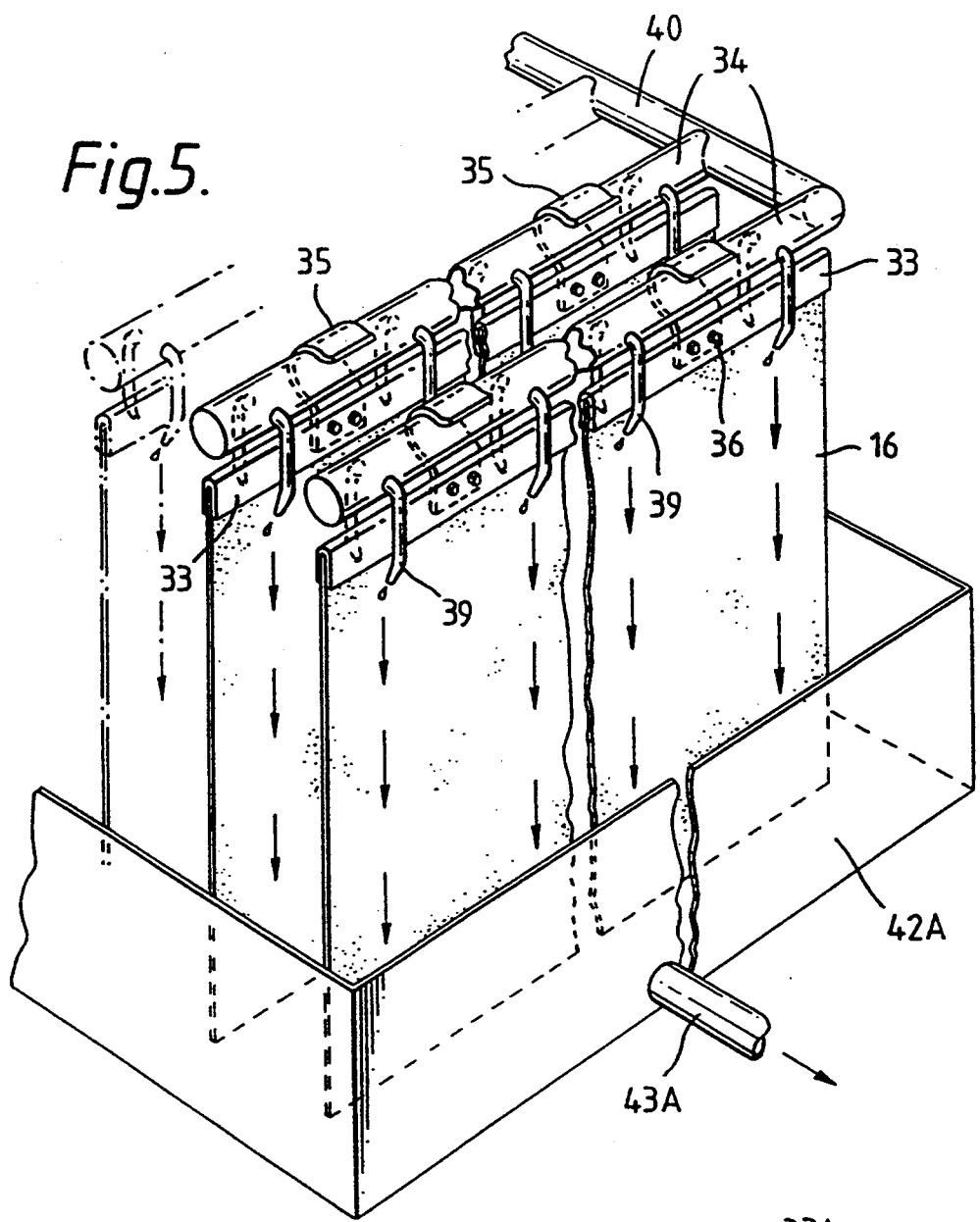
FIG. 5 represents a detailed perspective view of a module or array of hanging curtains and associated conduits.

In the drawings and in FIG. 1 in particular there is shown an area or room 13 for waste treatment in accordance with the process of the invention. There is included two rows 14 of separate hanging curtain modules 15 which are each separately movable. Each module 15 comprises a plurality of hanging curtains 16. When required a module 15 may be transported by appropriate means (eg overhead crane or gantry, a wheeled carriage or a carriage on tracks for example) to a harvesting assembly 18 (this is indicated by arrow 17) wherein separate curtains 16 are removed from an associated module (shown by arrow 19) and subsequently harvested by the harvesting assembly 18 individually before being replaced on module 15. When each curtain 16 is harvested of micro-organisms in a module 15 the module 15 may then be moved back to its location in each row 14. The harvesting assembly 18 as shown in FIGS. 2-4 includes a pit 21 with exit conduit 22, opposed harvesting rollers 23 movable from a non-operative position shown in full outline (this is indicated by the arrows 20 in FIG. 2). Also shown is a module 15 of separate curtains 16 which are all suspended from a common support rod 24 which also is supported by a crane hook 25 and support cable 26. The support member rod 24 also has hooks 27 for attachment to cable 26. The arrows in full outline in FIG. 3 show a module 15 being lowered into the harvesting pit 21. FIG. 1 also shows motor 30 for driving rollers 23 through opposed transmissions 31 and bearings 32.

As shown in FIG. 4 each curtain includes a base layer 27 and opposed layers 28 of reticulated foam 29.

Figure 6:
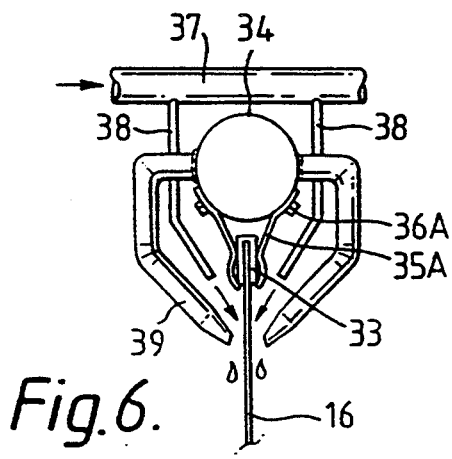
FIG. 6 represents a side view of a similar assembly to that shown in FIG. 5 but illustrating a different form of releasable attachment means.

In one example of module 15 shown in FIG. 5 each curtain 16 provided with a top flange 33 which is clamped to a suitable support tube. 34 by attachment members 35 releasably clipped to support tube 34. Flange 33 are bolted to attachment members of support tubes 34 by bolts 36. In a variation of releasable attachment means in FIG. 6 there may be provided resilient clamps 35A which releasably retain an associated flange 33 of a curtain 16. Clamps 35A may be bolted to support tube 34 by bolts 36A. There is also shown in FIG. 5 a header or manifold 40 for support tube 34 which convey liquid waste through opposed conduits 39 to each side of curtain 16 adjacent flange 33. This may be by way of drip feed or by use of jets or nozzles as required. The arrows in full outline in FIG. 5 indicate the downward passage of the liquid waste having regard to each curtain 16. There is also included waste collection trough 42A and associated transfer conduit 43A. There is also shown in FIG. 6 opposed conduits 38 for conveying warm humidified pressurised air to each side of curtain 16 adjacent flange 33. Each conduit 38 communicates with air manifold 37. The air feed means is omitted from FIG. 5 for the sake of clarity and convenience.

Figure 7:
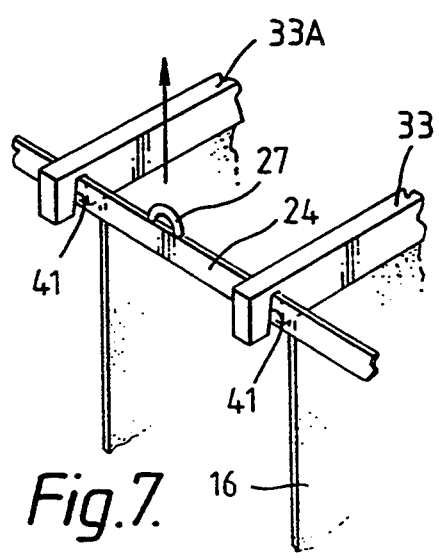
FIG. 7 is a perspective view of an assembly of hanging curtains for use with the waste treatment apparatus of the invention.

FIG. 7 shows a detailed view of support rods 24 supporting flanges 33 of each curtain 16 whereby rods 24 engage in notches 41 in the ends of flanges 33A. There is also shown crane attachment location 27.

Figure 8:
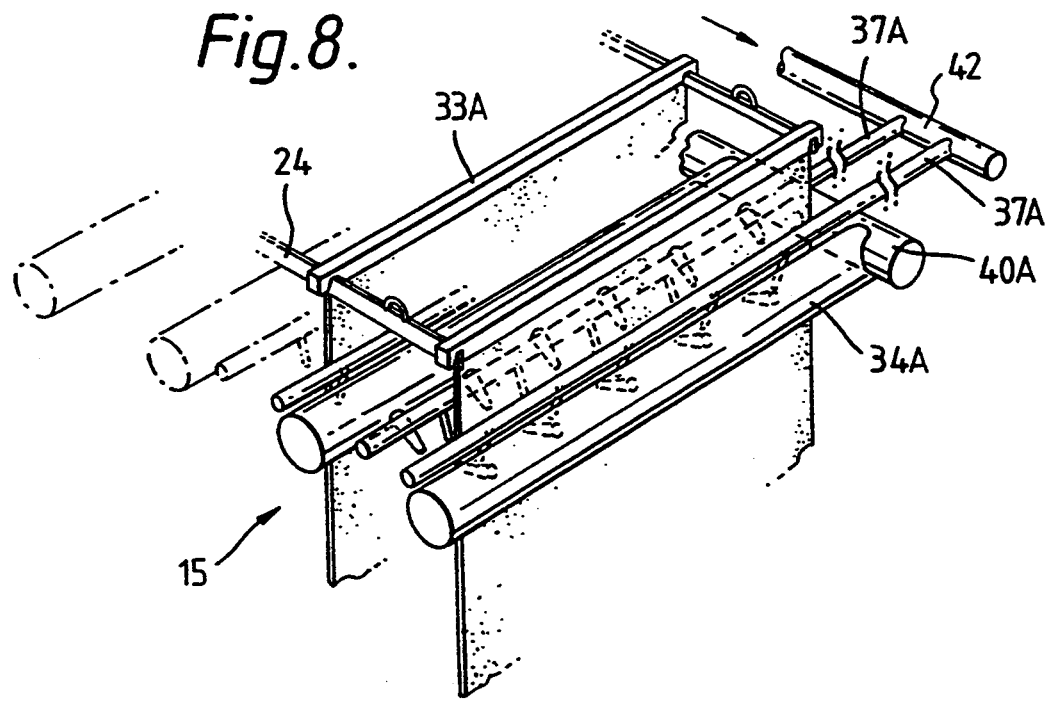
FIG. 8 represents a similar assembly to that shown in FIG. 5 but having a different arrangement of conduits.
Figure 9:
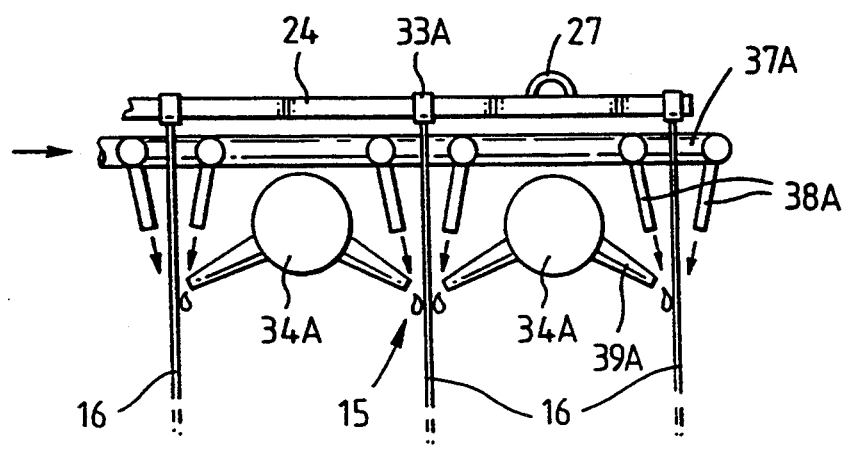
FIG. 9 is a side view of the assembly shown in FIG. 8.

In FIGS. 8-9 there is shown a modified assembly to that described in FIGS. 5-6. In this assembly curtains 16 and associated top flanges 33A are attached to support rods 24 as already shown in FIG. 7. Waste feed conduits 34A transport liquid waste via opposed conduits 39A and air jets 38A are attached to an associate air feed conduit 37A which communicates with manifold 42. All conduits 34A communicate with a common manifold 40A.

Example I—Distillery Waste

Figure 10:
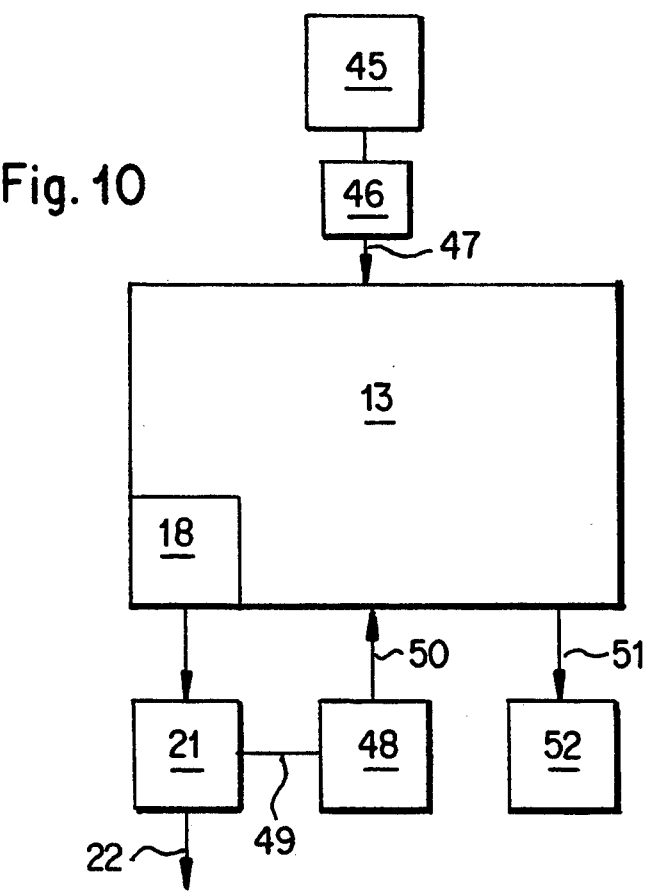
FIG. 10 is a schematic representation of a waste treatment plant constructed in accordance with the invention as applied to distillery waste.

Effluent from the fermentation of sucrose to ethanol using "Zymomonas *mobilis:* (e.g. as described in Australian Patent 563643) is pumped as shown in FIG. 10 from a distillation vessel 45 through a line 47 by a pump 46 to treatment area 13 previously described in FIG. 1. After the curtains 16 are harvested by harvesting assembly 18 cell rich pressings which constitute a bottom part of pit 21 are passed out through line 22 for ultimate sale as useful biomass. The supernatant from the pressings is passed into tank 48 through line 49 and is retained in tank 48 under an atmosphere of carbon dioxide before being recycled back to treatment area 13 through line 50 preferably to a series of curtains 16 that have been especially prepared for treatment of the supernatant. The treated liquor from treatment area 13 is then passed out through line 51 into tank 52 for discharge into the sewers. The waste treatment area 13 is maintained between 25° C.–30° C. with relative humidity being greater than 90%.

In experiments effected to date on such distillery waste, the total oxygen demand (TOD) of the waste was reduced from 80.9 g/L to 0.9 g/L ie. a 99% reduction.

In Example 1 the distillery waste was applied to a single curtain and the waste was allowed to flow over a weir mounted on top of the curtain which was impregnated with *C. ingens.* The waste influent was heated to 90° C. through a series of coils (not shown) before being processed by the hanging curtain 16.

Example 2—Piggery Waste

Piggery waste consists of liquid and solid material and in this form is not suitable for direct application to the curtain. Moreover, the solid consists of both digestible and indigestible (lignocellulose) matter. Before the process or apparatus of the invention can be employed to treat this waste, the digestible matter is desirably separated from the indigestible and made soluble. This can be accomplished by acidogenic fermentation for example.

Acidoqenic fermentation

Waste was obtained from the 80 sow piggery at the Veterinary Science Farm of the University of Queensland. Matter flushed from the pits beneath a pig shed was found to contain 2% solids. For the purposes of the investigation solid pig faeces were fermented with fluid collected from the drains of the piggery. This liquor contained urine, wash water, the overflow of automatic pig waterers (spring loaded nozzles) and presumably some products of fermentation of faeces and spilt feed, although gas chromatographic analysis did not reveal the presence of any volatile fatty acids.

The concentration of the solids was 2% (W/V). Three different aliquots each of 2L of the mixture were fermented semi-continuously with once daily feeding so that the mean residence times were 3, 4 and 5 days respectively. The temperature was maintained at 37° C. Samples for analysis were collected daily after the fermentations had been operating daily for 14 days. The results are presented in Table 4.

TABLE 1

Fermentation of pig faeces in pit fluid (solids 2% w/v) at residence times of 3, 4 or 5d, temperature 37 C., pH 5.8–6.0.

| | |
|---|---|
| 5 day residence time | mean TOD 8550 mgL$^{-1}$ ± 790* |
| | mean VFA 38.27 mM ± 5.7 |
| | mean NH$_3$N 850 mgL$^{-1}$ ± 140 |
| 4 day residence time | mean TOD 6720 mgL$^{-1}$ ± 790 |
| 3 day residence time | mean TOD 5220 mgL$^{-1}$ ± 760 |
| Pit fluid taken from beneath the pigs | mean TOD 3110 mgL$^{-1}$ ± 60 |

No change in TOD resulted from fermenting the pit fluid with a 2 day residence time, nor was there any increase when faeces and pit fluid were fermented for 6 days.
*Standard deviation. n = 8

Treatment of fermented piggery waste by microbial curtain

Forty liters of piggery waste (2% W/V) was fermented with once daily feeding and a 5 d residence time. After a startup time of 14 d had elapsed, 8L were removed daily before feeding; the pH was lowered to 4.0 with concentrated sulphuric acid. This procedure kills enteric pathogenic bacteria with the resultant free volatile fatty acids and provides acidophilic yeasts and fungi with a medium which has an acceptable pH (Henry et al J. Appl. Bact 55:89–95 (1982)). When the solids had settled the supernatant was decanted and frozen. When a sufficient volume had been collected, samples of the fermented liquor (feed) were thawed. The feed was held in a cold room and pumped on to a hanging curtain which had been inoculated with *C. ingens* previously grown as a pellicle on a sample of the feed. Within one week the organism had adapted to the new milieu and had grown first within the labyrinth of the curtain and then over its surface as a lawn. The spent liquor from the first passage of 2 m was saved and later passaged through a second 2 m curtain. The results are displayed in table 2.

TABLE 2

Reduction of TOD in fermented piggery waste after passage through microbial curtain

| | TOD Feed mgL$^{-1}$ | TOD Spent Liquor mgL$^{-1}$ | TOD % Reduction | pH Feed | pH Spent Liquor |
|---|---|---|---|---|---|
| C1 | 6670 ± 810 | 2430 ± 670 | 63 | 4.18 | 5.22 |
| C2 | 1590 ± 340 | 810 ± 150 | 49 | 5.20 | 6.33 |
| Total Reduction | 6670 ± 810 | 810 ± 150 | 88 | | |

The losses between spent liquor 1 and fee 2 occurred during freezing, preservation and thawing; it was not possible to run the feed through one 4 m curtain.

Removal of Phosphorus

Mineral analysis of *C. ingens* (Henry et al 1976) revealed that when the organism was grown as a pellicle of fermented piggery waste, the concentration of phosphorus in the organism was estimated at 7% of the dry matter. Yeilds ranged from 1.9–3.31 gL$^{-1}$. If a mean yield of 2 gL$^{-1}$ was assumed this would mean that the removal of phosphorus by the organism was 140 mgL$^{-1}$ of waste. Because the pits at the University piggery do not drain completely when flushed, there has been an accumulation of phosphorus over the years so that concentrations of 340±40 mgL$^{-1}$ of phosphorus occur. A single passage through a 2 m curtain reduced this value to 270±40 mgL$^{-1}$. Thus the curtain removed 70 mgL$^{-1}$. This was a preliminary examination of phosphorus removal only and a more rigorous study is indicated because a determination of the concentration of phosphorus in another piggery effluent in which the underfloor drains were will flushed daily yielded a value of 80 mgL$^{-1}$. It may be that the microbial curtain could be an effective means of reducing the phosphorus concentration in effluents.

Evaporative losses

There were significant losses of water due to evaporation as the waste was passaged through the curtain; so the TOD values, reported for the spent liquor, are higher than would be the case if evaporation was minimal. In later work, using a different waste, the curtain has been operated in a humid atmosphere and improved efficiency of TOD removal has resulted. It was also found in later studies that in a high humidity environment, >90% relative humidity and an air temperature 27° C., that a dense microbial population could be established on a curtain in 24 h.

Because the dominant organisms on the curtain are mainly pellicle-forming oxidative organisms which are able to obtain their oxygen directly from the atmosphere (Henry et al 1983 European J. Appl. Microbiol. Biotechnol. 1.8:109–113), the curtain offers a simple alternative to the usual means of obtaining aerobic growth: to pump air into a large vessel where the organisms grow in submerged culture. The curtain allows ready diffusion of gases to and from the microbial environment.

Rough calculations indicate that the curtain technique could be efficient in treating the large quantities of strong waste which are generated in commercial enterprises. Example 3—Brewery Waste Strong brewery waste was trickled through a vertical curtain consisting of two 3 mm layers of reticulated polyurethane foam bonded to a reinforcing nylon cloth core. A filamentous fungus, *Geotrichum fragrans* adhered to the curtain and provided a matrix for other yeasts and aerobic bacteria which include Kloeckera lindneri and a *Candida sp.*, a *Bacillus sp.* and a *Coruynebacterium sp.* The organisms grew as a lawn. To avoid anaerobicsis the lawn was harvested periodically by passing the curtain through rollers leaving a viable representative residue of the population. Passage through 5 m of curtain reduced a TOD of 55,000 mgL$^{-1}$ to 3,300 mgL$^{-1}$ 94%). Probably the length of the curtain could be reduced to 4 m with a residence time of 9.6 h. One m$^2$ of curtain with a 4 m fall can treat 15Ld$^{-1}$.

The Microbial Curtain

The curtain consists of two 3 mm layers of reticulated polyurethane foam bonded to a reinforcing nylon cloth core. At laboratory scale curtains have been 2 m long and 0.1 m wide. The curtain is hung on a horizontal rail and waste is pumped by peristaltic pump via flexible tube to the top of the curtain.

Waste liquor is trickled down through the curtain which has been inoculated with suitable organisms. These organisms, nourished by the waste, grow throughout the reticulations of the polyurethane foam and spread over the surface of the curtain as a lawn. During growth the organisms remove TOD from the waste and concurrently obtain their oxygen from the air by diffusion and expire carbon dioxide. A thin film of waste is thus exposed to a large surface area of microorganism. While investigating the treatment of strong brewery waste, a filamentous yeast *Geotrichum fragrans* was isolated along with some other organisms from the effluent drains of a brewery. *G. fragrans* adhered tenaciously to the curtain and was the dominant organism in the population. In addition a population of nonadherent yeasts and bacteria was present within the matrix formed by the labyrinth of the reticulations of the curtain and the adherent fungal filaments. Included were *Kloeckera lindneri* and an unnamed *Candida sp.*, a *Bacillus sp.* and a *Corynebacterium sp.* Eventually such a thick lawn is produced that nutrition is denied to some cells and the efficiency of the curtain is impaired. To overcome this problem it is necessary to remove some cells so that a young, vigorously growing cell population can be maintained. This is accomplished by passing the curtain between a pair of rollers; excess growth is removed, but a viable, representative residue of the population still remains on the curtain because of the adherence of the fungus, and its entrapped yeasts and bacteria. Thus the curtain configuration provides a self-reproducing, cell immobilisation on a solid support. This immobilised population begins vigorous regrowth when more waste is fed into the top of the curtain.
Techniques used.

TOD was determined by means of an TOD/TOC/TC Analyser (Ionits 1270M) and volatile fatty acids were estimated by a gas-liquid chromatography (Varian Model 3700 with FID). A stainless steel column was packed with Altech 10% AT-1200+1% $H_3PO_4$ on chromosorb WAW 80/100 mesh. Injector, column and detector temperatures were 120° C., 110° C., 150° C. respectively. Gas flow rates, $mLmin^{-1}$, were nitrogen 30; air 300; hydrogen 20. The procedure for analysis was as described by Holdeman et al (1977) Anaerobe Laboratory Manual 4th Edition except that chloroform was substituted for ethylether. Gas-liquid chromatography was also used to determine ethylalcohol with propanol as an internal standard. Phosphorus was estimated by means of the inductively coupled plasma method, and carbohydrate was determined by the phenolsulphuric acid method.

Brewery Waste

The strong liquid waste voided by breweries is composed mostly of beer lost during the bottling process. Analysis of the strong waste stream revealed a TOD of 60,000 $mgL^{-1}$. The object was to reduce a TOD of 60,000 $mgL^{-1}$ to 21 4,000 $mgL^{-1}$. The latter figure was the value below which the local municipal authority would accept the waste at its treatment plant without financial penalty to the producer. The beer from the brewery had a TOD of 126,000 $mgL^{-1}$. For the purpose of the study a simulated waste was made consisting of equal parts of beer and water, the beer being provided from containers of 81L capacity containing beer which had either lost most of its carbon dioxide or had become contaminated.

Early in the study it was shown that in order to grow micro-organisms in the waste, nitrogen, phosphorus and sulphur had to be added. The addition of agricultural grades of diammonium phosphate $(NH_4)2HPO^4$ and ammonium sulphate $(NH_4)_2SO_4$ provided for growth of the organisms but during passage of the waste through the curtain acidification occurred so as to inhibit growth. This difficulty was overcome by modifying the quantities of the two ammoniacal compounds and including urea. Ureolytic organisms in the curtain, degraded the urea, raising the pH of the microbial environment sufficient to allow copius growth of micro-organisms. The optimum quantities of the additives have not yet been determined, but data from one of the experiments in which. satisfactory results were obtained illustrate what might be expected from passage of brewery waste through a series of three curtains each 0.1 m wide with a 2 m fall and a flow rate of $0.25LH^{-1}$.

TABLE 3

Treatment of strong brewery waste through 3 × 2m of microbial curtain

| | Mean TOD Spent Liquor $mgL^{-1}$ | Mean TOD Spent Liquor $mgL^{-1}$ | % Reduction |
|---|---|---|---|
| C1 | 55000 ± 2230* | 9770 ± 1620 | 82 |
| C2 | 9770 ± 1620 | 6540 ± 890 | 33 |
| C3 | 6540 ± 890 | 3280 ± 380 | 50 |
| | Total Reduction | | 94 |

*Standard deviation n = 6

Numbers are rounded to the nearest 10 mg.

One volume of feed was passaged in sequence through a first, second and third curtain and analyses for TOD, total carbon (TC), total organic carbon (TOC), biological oxygen demand (BOD), carbohydrate, and ethyl alcohol were carried out by our own and other cooperating laboratories.

TABLE 4

Analyses of strong brewery waste during passage through 3 × 2m of microbial curtain

| | TOD $mgL^{-2}$ | TC $mgL^{-1}$ | TOC $mgL^{-1}$ | BOD $mgL^{-1}$ | CHO % | ETOH % |
|---|---|---|---|---|---|---|
| Feed | 52,990 | 16,010 | 14,700 | 34,400 | 1.18 | 2.04 |
| C1 | 13,390 | 4,720 | 4,960 | 7,910 | 0.65 | 0.12 |
| C2 | 6,940 | 2,440 | 2,590 | 3,300 | 0.33 | 0 |
| C3 | 4,890 | 1,730 | 1,060 | 720 | 0.15 | 0 |
| % Reduction | 91 | 89 | 93 | 98 | 87 | 100 |

TABLE 5

Changes in the utilisation of nutrients in a 24 hour period.
The spent liquor leaving a curtain with a 2m fall was sampled every 3 hours over a 24 hour period and analysed for TOD, and $NH_3N$; pH values were noted.

| | h | TOD $mgL^{-1}$ | % Reduction | $NH_3N$ mgL | % Reduction | pH |
|---|---|---|---|---|---|---|
| Feed | 0 | 47,600 | | 400 | | 6.61 |
| | 3 | 15,300 | 68 | 270 | 39 | 4.53 |
| | 6 | 13,400 | 72 | 300 | 32 | 4.17 |
| | 9 | 13,400 | 72 | 290 | 34 | 3.92 |
| | 12 | 13,100 | 72 | 250 | 43 | 3.79 |
| | 15 | 11,700 | 75 | 220 | 50 | 3.70 |
| | 18 | 12,600 | 73 | 270 | 39 | 3.69 |
| | 21 | 11,400 | 76 | 300 | 32 | 3.69 |
| | 24 | 18,600 | 61 | 330 | 25 | 4.02 |

Figure 11:
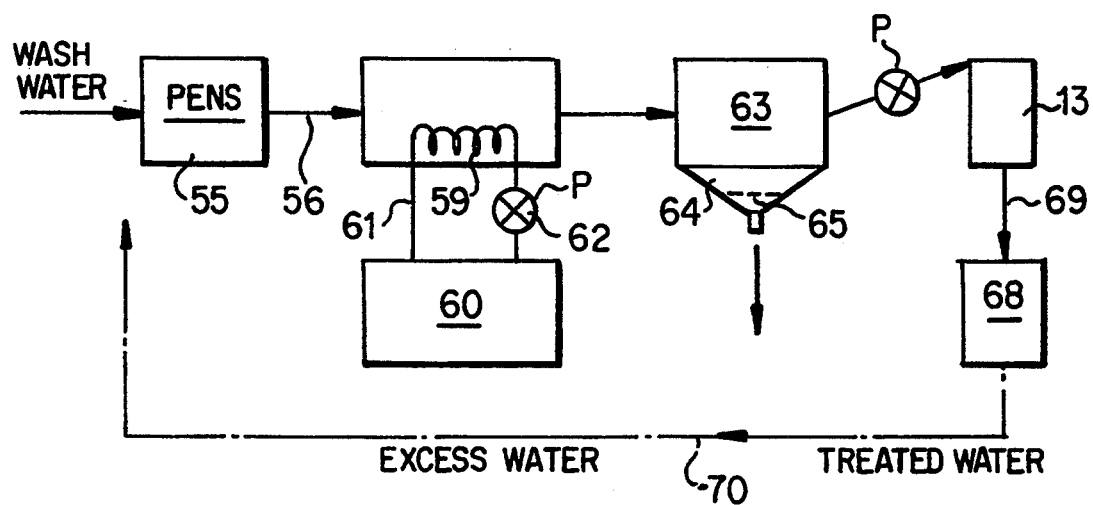
FIG. 11 is a schematic representation of a waste treatment plant constructed in accordance with the invention as applied to piggery waste.

Reference may also be made to FIG. 11 which illustrates a waste treatment plant of the invention as applied to piggery waste. Waste which comprises piggery waste washed out of the pens 55 with wash water from is passed through line 56 to digester 57 for a period of 5 days at 35° C. and at a pH of 5.5–6.3 and more preferably 5.8–6.0. The contents of anaerobic digester 56 are heated by a heat exchanger 49 by fluid from a solar pond 60 which is pumped through line 61 by pump 62. As soon as an amount of material from anaerobic digester 56 is extracted to be passed to a settlement tank 63 through line 66 it is replaced by an equivalent amount of material from pens 55. The settlement tank is provided with a conical bottom 64 and a drain 65 for removal of the unwanted sludge which is then disposed of. The pH is suitably 4.6 or less and volatile fatty acids (VFAs) are produced in settlement tank 63. The pH in tank 63 may be lowered by additives of sulphuric acid, fermentable carbohydrate, fowl manure, lactic acid, whey or other pH reduce. The resultant waste may then be passed through line 67 to curtain processing area 13 before discharge to tank 68 through line 69 whereby treated effluent 70 may be passed into the sewers. Excess water may then be applied to pens 55 if desired.

For the treatment of brewery waste a similar treatment may be used as shown in FIG. 10 for treatment of distillery waste. Suitably the waste applied to tank 45 in the case of brewery waste comprises spilt beer and the last runnings.

Figure 12:
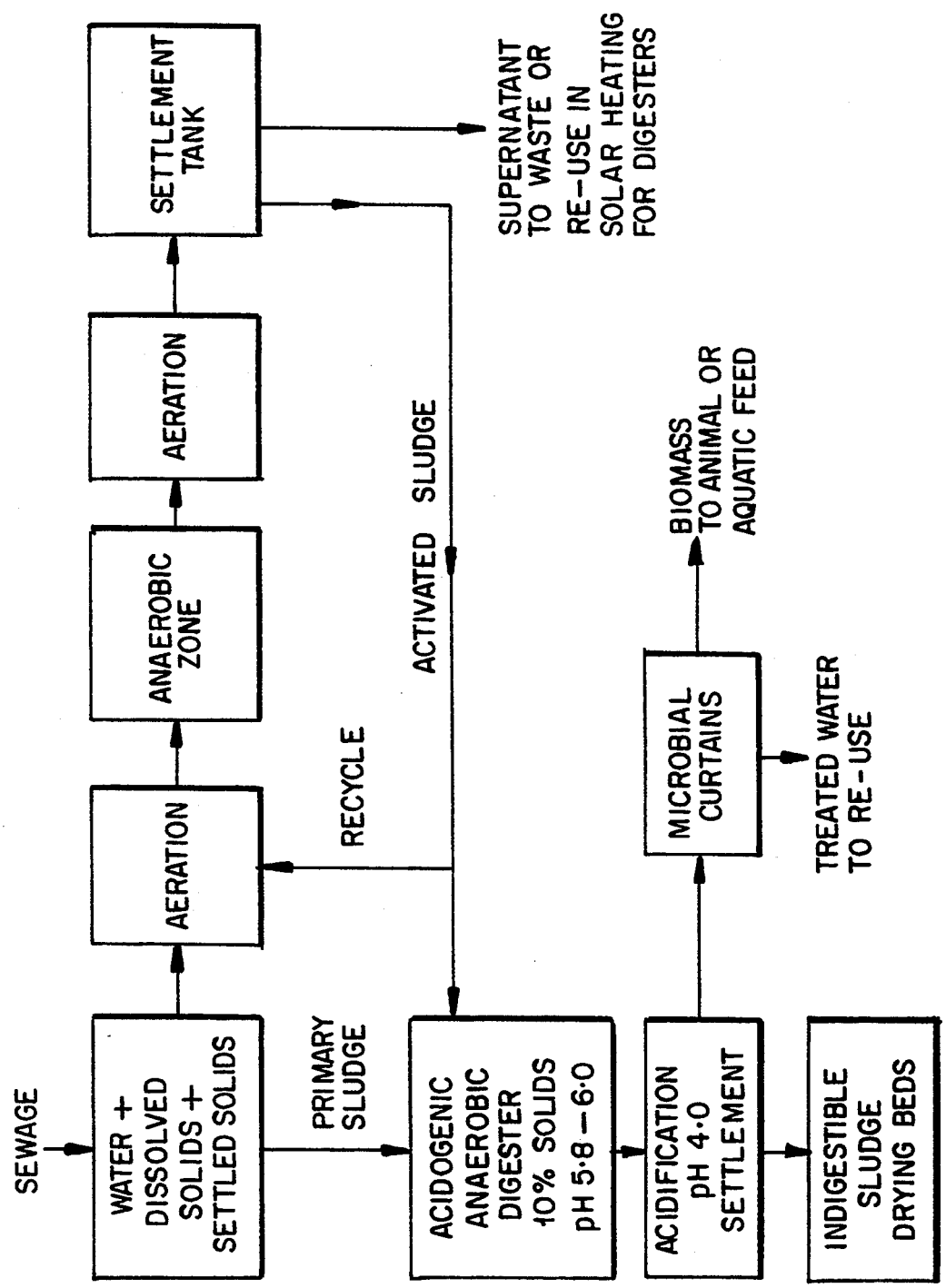
FIG. 12 is a schematic representation of a waste treatment plant constructed in accordance with the invention as applied to sewage waste and including an acidogenic digester.

Reference may also be made to FIG. 12 which refers to a schematic process and plant in accordance with the invention for treatment of sewage. The first aeration step may be the waste being passed into a tank open to atmosphere and being mechanically agitated by suitable means. Subsequently the waste may be passed into an open topped tank where it may ferment anaerobically before passage into a second aeration tank wherein phosphorous may be picked up as well as volatile free fatty acids (VFAs). A suitable bacteria such as Acinetobacter may be added to the second aeration tank to accomplish these objectives.

In relation to the utilisation of wastes by micro-organisms, the present invention has the following advantages over known techniques:

(1) aeration costs can be reduced as the air flows generated by the pressurised currents oxygenate the micro-organism and remove the $O_2$;

(2) apart from any initial pH firing for the substrate, no further pH controls are required; in particular, it is not essential to monitor the pH of the waste liquor as it passes down the curtain;

(3) no anti-foaming equipment or chemicals are required;

(4) moving parts are minimal and, essentially, the only operating costs are in pumping-the liquids to and from the unit;

(5) the environment around the curtain can be heated by the hot substrate;

(6) the SCP can be grown on both sides of the curtain, which, if of cellular construction, has a massive surface area, and can be easily harvested;

(7) there is no tension on the curtain which could cause failure thereof;

(8) the clear liquid spent liquor can be recycled.

The present invention provides a comprehensive and successful process for the treatment of biological wastes which should find application in the treatment of a variety of wastes, for example, wastes of cattle feedlots (beef and dairy), domestic sewage, brewery, fruit juicing and canning, abbatoirs, dairy, cheese or soft drink factories and alcohol distilleries and food and drink processing in general. The biomass produced should be useful for animal or fish feeds.

Other advantages apart from the reduction in TOD and carbon, include elimination of mal odour, the destruction of many pathogenic bacteria that can occur in the waste and a control over the levels of phosphorus and/or nitrogen present after treatment.

The embodiment described are by way of illustrative examples only and various changes and modifications may be made thereto without departing from the present inventive concept.

I claim:

1. A process for treatment of biological waste including the steps of:
   (i) passing biological waste liquid downwardly through at least one substantially vertically orientated curtain having a reinforcing layer of support material and attached thereto at least one layer of flexible reticulated open cellular material having a plurality of communicating cells which form a support for filamentous micro-organisms and/or symbionts included in said filamentous micro-organisms and wherein said filamentous micro-organisms and/or symbionts form a dense mat of cellular material adhering to said support; and
   (ii) collecting said biological waste after passage through the curtain for ultimate disposal.

2. A process as claimed in claim 1, wherein the biological waste liquid is passed through the curtain at a flow rate of between 0.40 to 1.00 liters per sq m of curtain per hour.

3. A process as claimed in claim 2, wherein the flow rate is between 0.50 to 0.75 liters per sq m of curtain per hour.

4. A process as claimed in claim 3, wherein the flow rate is 0.625 liters per sq m of curtain per hour.

5. A process as claimed in claim 1, wherein the curtain has a pair of broad surfaces and the biological waste liquid is dripped onto the curtain on each broad surface adjacent the top of the curtain.

6. A process as claimed in claim 1, wherein the residence time of the biological waste during passage through the curtain is 1.5–3.0 hours per meter fall.

7. A process as claimed in claim 6, wherein the residence time is 2.0–2.5 hours per meter fall.

8. A process as claimed in claim 1, wherein the curtain is 3–5 meters long.

9. A process as claimed in claim 8, wherein the curtain is 4 meters long.

10. A process as claimed in claim 1, wherein the curtain has a pair of broad surfaces and pressurised air is applied to one or both broad surfaces of the curtain.

11. A process as claimed in claim 10, wherein the pressurised air is humidified so as to provide a water content of at least 60%.

12. A process as claimed in claim 11, wherein the pressurised air is humidified so as to provide a water content of at least 90%.

13. A process as claimed in claim 1, wherein piggery waste or sewage waste containing carbohydrates, proteins or lipids is subjected to an acidogenic fermentation step to generate organic acids containing 8 carbon atoms or less and thereafter passed to said curtain.

14. A process as claimed in claim 13, wherein said acidogenic fermentation is stopped prior to evolution of methane.

15. A process as claimed in claim 1, wherein brewery waste or distillery waste is passed through said curtain and thereafter separated into a sludge fraction and a supernatant fraction, which supernatant fraction is maintained under an atmosphere of carbon dioxide and thereafter again passed through the curtain.

16. A process as claimed in claim 1, wherein the curtain is periodically harvested of microorganisms before again being utilised for treatment of biological waste.

17. A waste treatment plant for treatment of biological waste including:
   (i) at least one hanging curtain having a reinforcing layer of support material and attached thereto at least one layer of flexible reticulated open cellular sheet material having at least one broad surface for supporting growth of adherent filamentous microorganisms;

(ii) means for applying biological waste in liquid form to the broad surface of the hanging curtain;

(iii) means for passing pressurised air over the broad surface of the hanging curtain; and (iv) collection means for collecting processed waste effluent after passage through the curtain.

18. A waste treatment plant as claimed in claim 17, wherein the reinforcing layer is made of synthetic material which is sandwiched between two layers of the sheet material which is in the form of a soft reticulated polyurethane foam.

19. A waste treatment plant as claimed in claim 17 also including harvesting means for harvesting microorganisms from the hanging curtain.

20. A waste treatment plant as claimed in claim 19, wherein the harvesting means comprises a set of opposed rollers which contact an adjacent broad surface of an associated hanging curtain.

21. A waste treatment plant as claimed in claim 20, wherein said rollers are movable from an outer inoperative position to an inner operative position.

22. A waste treatment plant as claimed in claim 17, wherein there is provided an array of curtains that are hung or attached from a common support which is movable from a waste treatment area to a harvesting area.

23. A waste treatment plant as claimed in claim 17, wherein the cellular sheet material is formed from a woven mat.

24. A waste treatment plant as claimed in claim 17, wherein the cellular sheet material is formed from a soft foam.

25. A process as claimed in claim 1, wherein the reinforcing layer is disposed between two layers of reticulated open cellular material.

* * * * *